United States Patent [19]

Trouilhet

[11] Patent Number: 5,750,611

[45] Date of Patent: May 12, 1998

US005750611A

[54] THERMOPLASTIC COMPOSITION HAVING ADSORPTION AGENT TO REDUCE OFFENSIVE ODORS AND FLAVORS

[75] Inventor: Yves Trouilhet, Geneva, Switzerland

[73] Assignee: E. I. du Pont de Nemours and Company, Wilmington, Del.

[21] Appl. No.: 676,237

[22] PCT Filed: Jan. 17, 1995

[86] PCT No.: PCT/US95/00207

§ 371 Date: Jul. 17, 1996

§ 102(e) Date: Jul. 17, 1996

[87] PCT Pub. No.: WO95/20624

PCT Pub. Date: Aug. 3, 1995

[30] Foreign Application Priority Data

Jan. 19, 1994 [EP] European Pat. Off. ............. 94200102

[51] Int. Cl.$^6$ .................. C08J 5/10; C08K 3/34; C08L 23/04

[52] U.S. Cl. ................ 524/450; 523/102; 524/442; 524/444; 524/445; 524/447; 524/448

[58] Field of Search .................. 523/102; 524/442, 524/444, 430, 492, 493, 494, 437, 445, 450, 447, 448

[56] References Cited

U.S. PATENT DOCUMENTS

| 4,095,031 | 6/1978 | Engle | 526/1 |
| 4,761,437 | 8/1988 | Christie | 523/102 |
| 4,795,482 | 1/1989 | Gioffre et al. | 55/75 |
| 5,013,335 | 5/1991 | Marcus | 55/70 |
| 5,211,870 | 5/1993 | Gilbert et al. | 252/120 |
| 5,254,337 | 10/1993 | Marcus et al. | 424/76.1 |

*Primary Examiner*—Vasu Jagannathan
*Assistant Examiner*—U. K. Rajguru

[57] ABSTRACT

Odors and flavors in thermoplastic films and shaped articles may be reduced or eliminated by the addition of an adsorption agent to the thermoplastic. Thermoplastics include ethylene/acid copolymers and corresponding ionomers, and ethylene/acid/acrylate terpolymers and corresponding ionomers. The adsorption agent is a crystalline siliceous molecular sieve, having a framework of tetrahedral oxide units, in which at least 90% of the tetrahedral oxide units are SiO tetrahedra, a pore diameter greater than 5.5 Angstroms and a sorption capacity for water of less than 10% by weight at 25° C. and 4.6 torr.

9 Claims, No Drawings

THERMOPLASTIC COMPOSITION HAVING ADSORPTION AGENT TO REDUCE OFFENSIVE ODORS AND FLAVORS

BACKGROUND OF THE INVENTION

The present invention relates to the field of thermoplastic compositions suitable for extrusion into films and moulding into shaped articles, more particularly to such compositions containing adsorbents adapted to inhibit offensive odours and flavours of such films and shaped articles.

BACKGROUND OF THE INVENTION

Many films and shaped articles adapted for packaging applications have the unwanted characteristic of possessing undesirable odours and flavours. Such odours and flavours may make the packaging unsuitable for various applications, e.g. in the area of food or hygienic packaging or, in general, any packaging with which man comes into contact. Typically, these undesirable odours and flavours are generated during production of the film or shaped article, e.g. during the extrusion or moulding process.

Various solutions have been proposed for eliminating or inhibiting odours and flavours in thermoplastic films. Adsorbents such as zeolites, diatomaceous earth, clays, activated carbons and the like have been incorporated into certain polymer or copolymers with varying results (cf. e.g. WO 92/13029, WO 92/13899, JP 62032-144, JP 63151-451 and JP 02208-346).

It has now been found that various adsorbents will not only inhibit odours and flavours in particular thermoplastics, but also, that such adsorbents will have a surprising, beneficial effect on various performance characteristics, such as adhesion, heat seal strength, hot tack strength and coefficient of friction of the films produced from thermoplastic compositions containing the adsorbents.

SUMMARY OF THE INVENTION

The instant invention relates particularly to a thermoplastic composition comprising (a) a thermoplastic selected from the group consisting of ethylene/acid copolymers and corresponding ionomers; and ethylene/acid/acrylate terpolymers and corresponding ionomers; and (b) an adsorption agent; to thermoplastic films and shaped articles obtainable from this composition; and the use of adsorbents in in adsorbing odours and flavours in the aforementioned thermoplastics.

As used herein, terms used have the following meanings.

Ethylene/acid copolymer and their corresponding ionomers are well known in the art to be copolymers of ethylene with an olefinically unsaturated organic mono- or di-acid such as acrylic or methacrylic acid, or maleic acid or fumaric acid or their anhydrides, the acid (or anhydride) comprising about 0.5 to 50 mole percent of the total polymeric material. The ethylene/acid copolymers and their methods of preparation are well known in the art and are disclosed in, for example U.S. Pat. Nos. 3,264,272, 3,404,134, 3,355,319 and 4,321,337. The copolymers are termed ionomers when the acid is neutralized in whole or in part to produce a salt. The cation for said salts are usually an alkali metals such as sodium or potassium or is zinc or the like.

Ethylene/acid/acrylate terpolymers and corresponding ionomers are well known in the art to be copolymers of ethylene, an olefinically unsaturated organic acid such as acrylic or methacrylic acid and an alkyl acrylate or methacrylate termonomer (e.g. n-butyl acrylate or methacrylate or isobutylacrylate).

Preferred thermoplastics are ionomers that are copolymers of ethylene and 2 to 50%, more preferably 5 to 25%, by weight acrylic or methacrylic acid neutralized up to about 90%, preferably from 5 to 60% with an alkali metal ion or a divalent or trivalent metal ion, the melt index of the copolymer, whether neutralized or unneutralized, being about 0.1 to 30, preferably 0.5 to 20, dg/min. according to ASTM Standard D1238 (condition E).

Suitable acid copolymers and ionomers are available from the DuPont Company under the trade names Nucrel® and Surlyn®, respectively.

Adsorption agents are known per se. Suitable such agents include powders of diatomaceous earth, clay, kaolin, talc, bentonite, activated carbon and zeolites. Preferred adsorption agents are zeolites, and in particular siliceous molecular sieves.

Suitable siliceous molecular sieves are known in the art, see e.g. European Patent 0 297 543 B1, and have a framework of tetrahedral oxide units, in which at least 90% of the tetrahedral oxide units are SiO tetrahedra, have a pore diameter greater than 5.5 Angstroms (preferably at least 6.0 Angstroms) and have a sorption capacity for water of less than 10% by weight at 25° C. and 4.6 torr (preferably less than 6% by weight).

Preferred such sieves will have a framework $SiO_2/Al_2O_3$ molar ratio greater than 35, more preferably 200 to 500.

Suitable siliceous molecular sieves are available under the tradename Abscents® from UOP.

The amount of adsorbent in the polymer or copolymer composition according to the invention will depend upon various factors including the particular copolymer or terpolymer used. Typically the adsorbent agent will comprise at least 0.5% by weight of the composition, more typically 0.5 to 2.0% by weight of the composition as employed in the end product (film or shaped article) and up to about 30% by weight in the case of a "masterbatch" of composition.

In addition to the above-mentioned composition components, the thermoplastic composition of the present invention may further contain other additional polymeric components as well as the usual additional ingredients and additives conventionally employed in the art for various purposes in polymer compositions, such as, for example, dyes, pigments, fillers, anti-oxidants, fire-retarding agents, etc. When such optional ingredients are employed, their usage is generally in the content range or loading level typically utilized in the art for such purposes.

Films and shaped articles according to the invention can be made by conventional methods, e.g. extrusion coating, blown and cast film processing and injection moulding.

EXAMPLES

Compositions containing Surlyn® 1652 and various levels of Absents® 3000 are blended and extruded onto an aluminium foil (38 microns thick) to yield a 25 g/m² of coating of Surlyn® 1652, under the following conditions.

Extruder: Egan 3½", L/D=30 Temperatures from feed to final zone: 175°, 210°, 245°, 265°, 285° C. Speed: 53 rpm (max –270 rpm) Pressure: 59 bar Die temperature: 285° C. Air gap: 125 mm Line speed: 100 m/min

TABLE 1

| Extrusion Coating processability | | |
|---|---|---|
| Composition | total neck-in (mm) | drawability (m/min) |
| Surlyn ® 1652 | 65 | 250 |
| Surlyn ® 1652 +0.5% Abscents ® 3000 | 65 | 290 |
| Surlyn ® 1652 +2.0% Abscents ® 3000 | 55 | 260 |

Total "neck-in" (on both edges) is measured under the processing conditions given above. Total neck-in refers to the difference in width between the extrusion die and the the coating it produces. It is preferable to minimize neck-in so that coatings have a consistent, uniform width and edge.

Drawability is measured by leaving the extruder rpm at the setting giving 25 g/m² coating at 100 m/min and increasing the line speed until edge-weave of the coating is first observed. High drawability is desirable as it enables high line speeds and therewith improved efficiency of a coating operation.

Films and shaped articles produced from the compositions according to the invention have been found to have extremely low levels of carboxylic acids and aldehydes, which are known sources of odours.

Odour Analysis

Films extruded onto aluminium foils (as previously described) are heated to 70° C. for one hour. Volatiles produced are trapped in an adsorption tube. Tenax GC (5 mm diameter, 100 mm long) at -15° C., desorbed under rapid heating at 200° C. (within 50 seconds) and introduced in a gas chromatograph (Hewlett Packard Model 5890A) for separation. The volatiles are then introduced in a mass spectrometer for identification and respirated in parallel to detect the odour-producing components. As indicated in Table 2, the concentration of such strong odour-producing components such as butyric acid, 2-methyl butyric acid, valeric acid, pentanal and hexanal, is greatly reduced.

TABLE 2

| Volatiles (parts per hundred) | | | |
|---|---|---|---|
| Volatile | Surlyn ® 1652 | Surlyn ® 1652 +0.5% Abscents ® 3000 | Surlyn ® 1652 +2.0% Abscents ® 3000 |
| carboxylic acid | | | |
| acetic | 57 | 57 | 32 |
| propionic | 135 | 86 | 6 |
| butyric | 12 | 4 | — |
| 2-methyl butyric | 629 | 199 | 7 |
| valeric | 7 | — | — |
| caproic | 4 | — | — |
| aldehyde | | | |
| formaldehyde | 19 | 13 | 15 |
| acetaldehyde | 30 | 36 | 41 |
| propionaldehyde | 8 | 8 | 10 |
| butyraldehyde | 9 | 7 | 4 |
| pentanal | 33 | 19 | — |
| hexanal | 32 | 11 | — |

Samples of Surlyn ® 1652 coated onto aluminium foil as previously described are tested for odour and taste.

In the odour test, 4 inch by 4 inch (10.2 cm by 10.2 cm) samples are stored in a sealed jar at 40° C. overnight. The samples are afterwards cooled for 1 hour before testing for odour. The samples are rated for intensity of odour on a scale of 1 to 8, with 1 being weakest and 8 being strongest intensity of odour.

In the taste evaluation, samples are formed into an 8.5 inch by 11 inch (21.6 cm by 27.9 cm) pouch and filled with 85° C. water. The pouches are stored at room temperature overnight. The water stored in the pouches is rated for intensity of taste on a scale of 1 to 8, with 1 being weakest and 8 being strongest intensity of taste.

TABLE 3

| taste and odour evaluation | | | |
|---|---|---|---|
| | Surlyn ® 1652 | Surlyn ® 1652 +0.5% Abscents ® 3000 | Surlyn ® 1652 +2.0% Abscents ® 3000 |
| Flavour | | | |
| overall | 3.5 | 2.0 | 2.0 |
| vinyl | 3.0 | 0 | 0 |
| bitter | 0 | 0 | 1.0 |
| metallic | 0 | 1.0 | 0 |
| Odour | | | |
| overall | 3.5 | 1.0 | 3.0 |
| polyethylene | 1.5 | 0 | 2.0 |
| sweet plastic | 0 | 1.0 | 0 |
| smoky/rubber | 2.0 | 0 | 0 |
| smoky/musty | 0 | 0 | 2.0 |
| musty | 1.0 | 0 | 0 |

In addition to having inhibited or eliminated undesirable odours and flavours, the thermoplastic compositions according to the invention have been found to possess surprising improvements in performance characteristics. Depending upon the particular end-use application, it can be critical that the film possess a certain level of adhesion to a foil (e.g. aluminium foil) and sealing properties.

Adhesion to foil

Adhesion to an aluminium foil of thickness 38 μm is tested using film samples produced by the extrusion coating process previously described. Extruder temperatures are as previously mentioned, except that for compositions based on Surlyn® 1702, the extruder temperature is, from feed to final zone 150°, 170°, 200°, 220°, 230° C., and the die temperature is 230° C.

TABLE 4

| Adhesion to Foil (100 mm/mn cross head speed) | |
|---|---|
| Composition | Adhesion (N/15 mm) |
| Surlyn ® 1652 | 4.1 |
| Surlyn ® 1652 +0.5% Abscents ® 3000 | 4.1 |
| Surlyn ® 1652 +2.0% Abscents ® 3000 | 4.5 |
| Surlyn ® 1702 | 6.0 |
| Surlyn ® 1702 +0.5% Abscents ® 3000 | 6.2 |
| Surlyn ® 1702 +2.0% Abscents ® 3000 | 6.6 |

Heat Seal Strength

Film samples are sealed on a KOPP heat sealer at a 1.0 sec dwell time and 0.5 MPa pressure. The seal strength is measured at 100 m/min cross head speed, according to ISO 9001 work instruction T91 of P&IP ETC, Meyrin.

TABLE 5

Heat Seal Strength (N/15 mm)

| Seal Bar Temp. (°C.) | Surlyn ® 1652 | Surlyn ® 1652 +0.5% Abscents ® 3000 | Surlyn ® 1652 +2.0% Abscents ® 3000 |
| --- | --- | --- | --- |
| 80 | 0.8 | 0.8 | 0.8 |
| 100 | 9.5 | 15 | 12 |
| 120 | 11 | 13 | 11 |

Hot-Tack Strength

The hot-tack strength of a film is a measure of the strength of a seal made with the film at a given temperature. High hot-tack strength is desirable since the need for cooling seals during, e.g. packaging process is reduced or elimated and packaging rates can thereby be increased. The hot-tack strength of samples is measured using a PACKFORSK hot-tack tester run at 0.3 MPa dwell pressure, 0.5 sec dwell time, 0.2 sec delay time and 150 mm/sec cross head speed, according to ISO 9001 work instruction T92 of P&IP ETC, Meyrin.

TABLE 6

Hot-Tack Strength (N/15 mm)

| Seal Bar Temp. (°C.) | Surlyn ® 1652 | Surlyn ® 1652 +0.5% Abscents ® 3000 | Surlyn ® 1652 +2.0% Abscents ® 3000 |
| --- | --- | --- | --- |
| 70 | — | 0.2 | 0.3 |
| 80 | 0.5 | 1.0 | 0.8 |
| 90 | 0.6 | 2.8 | 1.0 |
| 100 | 4.5 | 8.0 | 7.0 |
| 110 | 9.0 | 9.0 | 9.0 |

Coefficient of Friction

It is often desirable that a film has a low coefficient of friction (COF) to enable the film to slide easily against various surfaces during its manufacture, handling and use. It has been found that the films of the present invention have surprising lower COF's as compared to films made from compositions not containing the adsorption agent. COF is measured between two films formed from Surlyn® 1601, at the conditions described in work instruction T75 available from the Packaging and Industrial Polymer Laboratory of the DuPont Company in Meyrin, Switzerland. The results are:

TABLE 7

Coefficient of Friction

| % Abscents ® 3000 | Melt Temperature | |
| --- | --- | --- |
|  | 190° C. | 225° C. |
| 0 | 0.95 | 3.75 |
| 0.25 | 0.62 | 0.75 |
| 0.50 | 0.60 | 0.75 |
| 1.00 | 0.60 | 0.70 |
| 2.00 | 0.55 | 0.60 |

What is claimed is:

1. A thermoplastic composition comprising (a) a thermoplastic selected from the group consisting of ethylene/acid copolymers and copolymer/s of ethylene and 2 to 50% by weight acrylic or methacrylic acid neutralized upto about 90% with an alkali metal ion or a divalent or a trivalent metal ion; and ethylene/acid/acrylate terpolymers and copolymer/s of ethylene and 2 to 50% by weight acrylic or methacrylic acid neutralized upto about 90% with an alkali metal ion or a divalent or a trivalent ion; and (b) an adsorption agent which is a crystalline siliceous molecular sieve, having a framework of tetrahedral oxide units, in which at least 90% of the tetrahedral oxide units are SiO tetrahedra, a pore diameter greater than 5.5 Angstroms and a sorption capacity for water of less than 10% by weight at 25° C. and 4.6 torr.

2. A composition according to claim 1 wherein component (a) comprises a copolymer of ethylene and acrylic acid or methacrylic acid and copolymer/s of ethylene and 2 to 50% by weight acrylic or methacrylic acid neutralized upto about 90% with an alkali metal ion or a divalent or a trivalent metal ion; a terpolymer of ethylene, acrylic acid or methacrylic acid and an alkyl acrylate or methacrylate, and copolymer/s of ethylene and 2 to 50% by weight acrylic or methacrylic acid neutralized upto about 90% with an alkali metal ion or a divalent or a trivalent metal ion.

3. A composition according to claim 1 wherein component (a) is a copolymer of ethylene and 5 to 25% by weight acrylic or methacrylic acid neutralized from 5 to 60%.

4. A composition according to claim 1 wherein the crystalline siliceous molecular sieve has a framework $SiO_2/Al_2O_3$ molar ratio greater than 35.

5. A composition according to claim 1 wherein the adsorption agent comprises at least 0.5% by weight of the composition.

6. A thermoplastic film obtainable by extruding the composition according to claim 1.

7. A thermoplastic shaped article obtainable by moulding the composition according to claim 1.

8. A process for inhibiting the odors or flavors in films and shaped articles formed from a thermoplastic comprising an ethylene/acid copolymer or corresponding ionomer or an ethylene/acid/acrylate terpolymer or corresponding ionomer, comprising the step of adding an adsorption agent of claim 1 to the thermoplastic.

9. A method of using an adsorbent to inhibit odors or flavors in films and shaped articles formed from a thermoplastic, comprising adding an adsorbent to the thermoplastic to form a thermoplastic composition, wherein the adsorption agent is a crystalline siliceous molecular sieve, having a framework of tetrahedral oxide units, in which at least 90% of the tetrahedral oxide units are SiO tetrahedra, a pore diameter greater than 5.5 Angstroms and a sorption capacity for water of less than 10% by weight at 25° C. and 4.6 torr and wherein the thermoplastic comprises an ethylene/acid copolymer or corresponding ionomer or an ethylene/acid/acrylate terpolymer or corresponding ionomer.

* * * * *

UNITED STATES PATENT AND TRADEMARK OFFICE
CERTIFICATE OF CORRECTION

PATENT NO. : 5,750,611
DATED : May 12, 1998
INVENTOR(S) : Yves Trouilhet It is certified that error appears in the above-identified patent and that said Letters Patent is hereby corrected as shown below:

Column 6, line 4, claim 1 - delete [copolymer/s], add --copolymers--
Column 6, line 5, claim 1 - delete [upto], add --up to--
Column 6, line 7, claim 1 - delete [copolymer/s], add --copolymers--
Column 6, line 9, claim 1 - delete [upto], add --up to--
Column 6, line 20, claim 2 - delete [copolymer/s], add --copolymers--
Column 6, line 21, claim 2 - delete [upto], add --up to--
Column 6, line 25, claim 2 - delete [copolymer/s], add --copolymers--
Column 6, line 26, claim 2 - delete [upto], add --up to--
Column 6, line 45, claim 8; Column 6, line 46, claim 8; Column 6, line 60, claim 9; Column 6, line 61-62, claim 9 - delete [corresponding ionomer], add --copolymer/s of ethylene and 2 to 50% by weight acrylic or methacrylic acid neutralized up to about 90% with an alkali metal ion or a divalent or a trivalent metal ion--

Signed and Sealed this

Twenty-fourth Day of November, 1998

*Attest:*

BRUCE LEHMAN

*Attesting Officer*  Commissioner of Patents and Trademarks